(12) United States Patent
Torre et al.

(10) Patent No.: US 7,844,523 B2
(45) Date of Patent: Nov. 30, 2010

(54) AUTOMATIC MAPPING AND ALLOCATION OF BENEFICIAL INTERESTS IN TRUSTS FOR PORTFOLIO ANALYSIS

(75) Inventors: Nicolo G. Torre, Oakland, CA (US); Andrew T. Rudd, Orinda, CA (US)

(73) Assignee: Advisor Software, Inc., Lafayette, CA (US)

( * ) Notice: Subject to any disclaimer, the term of this patent is extended or adjusted under 35 U.S.C. 154(b) by 399 days.

(21) Appl. No.: 12/028,684

(22) Filed: Feb. 8, 2008

(65) Prior Publication Data

US 2008/0147570 A1    Jun. 19, 2008

Related U.S. Application Data

(60) Provisional application No. 60/889,241, filed on Feb. 9, 2007.

(51) Int. Cl.
*G06Q 40/00* (2006.01)
(52) U.S. Cl. ........................................ 705/35
(58) Field of Classification Search ................ 705/36 R
See application file for complete search history.

(56) References Cited

U.S. PATENT DOCUMENTS 7,249,077 B2 *  7/2007  Williams et al. .............. 705/35

OTHER PUBLICATIONS

Income Trusts: A "Tax-Efficient" Product or the Product of Tax Ineffciency? Hayward, Paul D, Canadian Tax Journal, v50n5 pp:1529-1569, 2002.*

* cited by examiner

*Primary Examiner*—Richard C Weisberger
(74) *Attorney, Agent, or Firm*—Haynes Beffel & Wolfeld LLP; Ernest J. Beffel, Jr.

(57) ABSTRACT

The present invention relates to analysis of trusts that have multiple beneficiaries whose interests mature in different time periods or under different conditions. In particular, we disclose automatic mapping of interests in one or more trusts, optionally subject to user confirmation, to long and short positions in financial or derivative interests that have expected payouts and costs that can be offset against underlying trust assets. The underlying assets and long and short positions in the mapped instruments can be attributed to various beneficiaries and subjected to various risk and investment analyses.

18 Claims, 4 Drawing Sheets

- Goals 101
- Beneficiaries 103
- Entites 105
- Assets 107

|  | 201<br>AM Trust | 202<br>AM IRA | 203<br>M Foundn | 204<br>DM Trust | 205<br>NM Trust | 206<br>RM Trust | 207<br>VT Trust | 208<br>HM Trust |
|---|---|---|---|---|---|---|---|---|
| 210 Alex M | 100 | 100 | 50 | 100 | 100 | 100 | 100 | 100 |
| 220 Sylvia M |  |  | 50 |  |  |  |  |  |
| 230 Helen M |  |  |  |  |  |  |  | 100 |
| 240 Didi M | 25 |  |  | 100 |  |  |  | 33 |
| 250 Nicki M | 25 |  |  |  | 100 |  |  | 33 |
| 260 Robert M | 25 |  |  |  |  | 100 |  | 33 |
| 270 Cedric M | 25 |  |  |  |  |  |  |  |
| 280 Jane M |  |  |  |  |  |  |  |  |
| 290 Violet T |  |  |  |  |  |  | 100 |  |

| 100 | Ownership | 100 | Deferred Inc + Principal | Also: |
| 100 | Control | 33 | Remainder | Deferred Income |
| 100 | Inc + Principle | 100 | Contingent Remainder | Contingent Income |
| 100 | Income |  |  | Terminal payout |

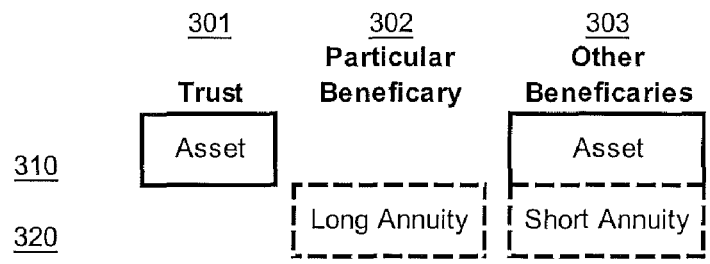
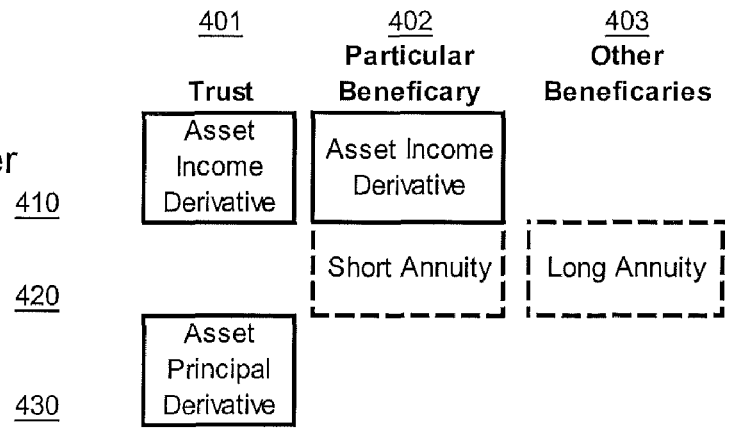
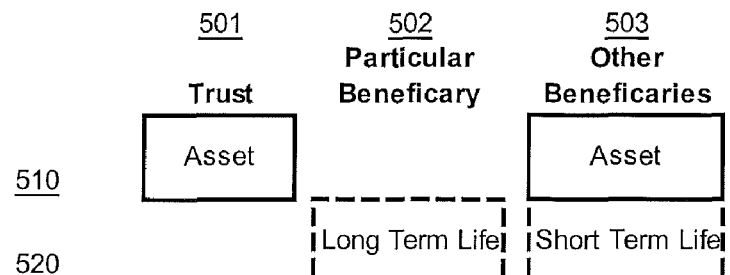
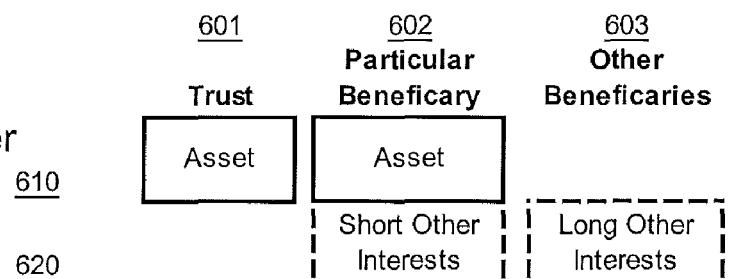

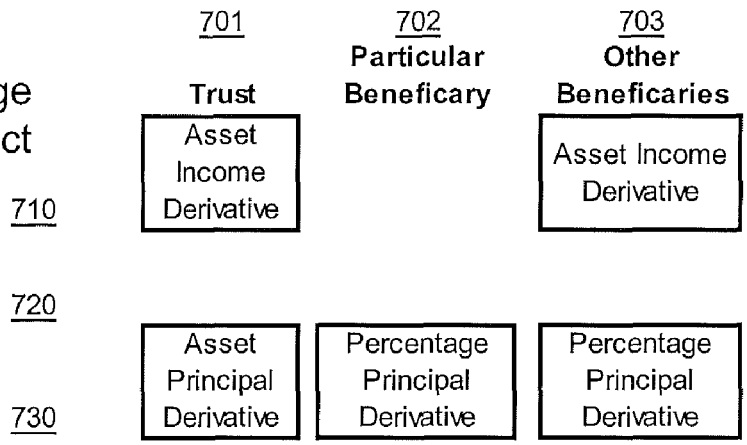
FIG. 7 PB Percentage Capital Subject To Income
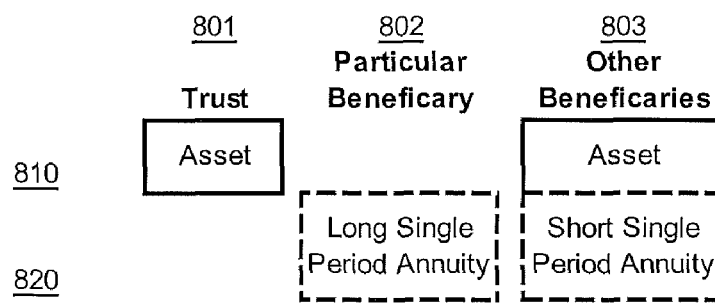
FIG. 8 PB Dollar Amount Capital Payout
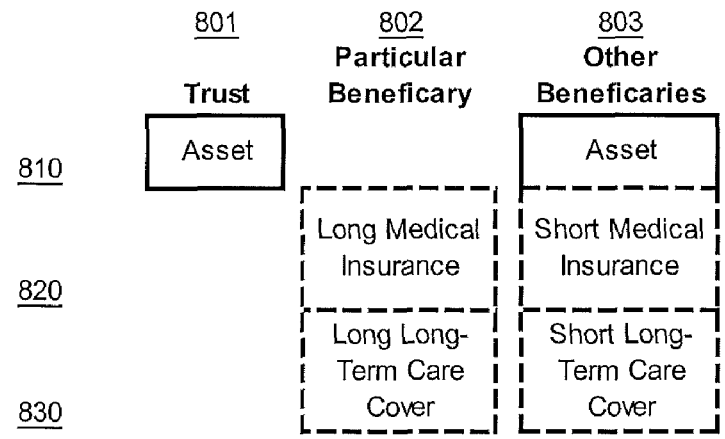
FIG. 9 PB Cost Recovery Medical / Care System
Interacting
With User Flowchart

AUTOMATIC MAPPING AND ALLOCATION OF BENEFICIAL INTERESTS IN TRUSTS FOR PORTFOLIO ANALYSIS

RELATED APPLICATION

This application is related to and claims the benefit of Provisional Application No. 60/889,241, filed 9 Feb. 2007, which is incorporated by reference. This application also is related and claims priority as a continuation-in-part of U.S. patent application Ser. No. 11/627,814 filed Jan. 26, 2007, which claims the benefit of Provisional Application No. 60/785,117. Those two priority applications are incorporated by reference. This application is related to and further claims the benefit of Provisional Application No. 60/979,765, filed 12 Oct. 2007, which is incorporated by reference.

The priority applications illustrate analyses that can be performed on and reported from the automatic mapping and allocation of beneficiary interests as disclosed in this application.

BACKGROUND OF THE INVENTION

The present invention relates to analysis of trusts that have multiple beneficiaries whose interests mature in different time periods or under different conditions. In particular, we disclose automatic mapping of interests in one or more trusts, optionally subject to user confirmation, to long and short positions in financial or derivative interests that have expected payouts and costs that can be offset against underlying trust assets. The underlying assets and long and short positions in the mapped instruments can be attributed to various beneficiaries and subjected to various risk and investment analyses.

The problems of managing an institutional portfolio or an individual retirement account have produced a substantial body of literature regarding analytical techniques. Several Nobel prizes in economics have been awarded for advances related to portfolio theory. However, the analysis is not applicable when legal entities such as trusts are interposed between assets and beneficiaries. These entities typically are employed to split risks and benefits of asset ownership among beneficiaries according to goals set by the original contributor of assets to the trusts. Many times, the entities allocate interests to achieve efficient tax and transfer benefits. By tax benefits, we mean favorable tax rates when income is realized. By transfer benefits, we mean favorable gift or estate tax rates when assets are transferred.

The economic situation of beneficiaries is transformed by the legal structure of trust and other entities. The economic situation of any particular beneficiary cannot be derived directly from the underlying assets, due to the entities.

An opportunity arises to develop a system and method for reducing the complex situation of portfolios held by trusts and other entities for the benefit of multiple beneficiaries to one which can be evaluated for individual beneficiaries using portfolio analysis techniques typically applied to institutional or individual portfolios.

SUMMARY OF THE INVENTION

The present invention relates to analysis of trusts that have multiple beneficiaries whose interests mature in different time periods or under different conditions. In particular, we disclose automatic mapping of interests in one or more trusts, optionally subject to user confirmation, to long and short positions in financial or derivative interests that have expected payouts and costs that can be offset against underlying trust assets. The underlying assets and long and short positions in the mapped instruments can be attributed to various beneficiaries and subjected to various risk and investment analyses. Particular aspects of the present invention are described in the claims, specification and drawings.

BRIEF DESCRIPTION OF THE DRAWINGS

FIG. 3-9 depict mapping of beneficiary interests to balanced combinations of long and short assets that can be evaluated for individual beneficiaries using portfolio analysis techniques.

FIG. 3 schematically depicts payouts to a particular beneficiary for life.

FIG. 4 schematically depicts a remainder interest in accumulated income for a particular beneficiary.

FIG. 5 schematically depicts a terminal payout to a particular beneficiary.

FIG. 6 schematically depicts a remainder interest of a particular beneficiary in an asset.

FIG. 7 schematically depicts a percentage interest of a particular beneficiary in an asset.

FIG. 8 schematically depicts a dollar amount interest of a particular beneficiary in an asset.

FIG. 9 schematically depicts a complex cost recovery interests of a particular beneficiary.

Additional figures appear in the applications that have been incorporated by reference.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

In the following paragraphs, we disclose how the complex situation of beneficiary interests in one or more trusts can be reduced to a portfolio analysis problem that can be addressed by a variety of techniques. For beneficiary interests in a portfolio, we construct combinations of long and short interests in financial or derivative instruments having the same payout and/or cost as the beneficiary interests. We then indicate a variety of analyses for entities and individuals that can be combined with our allocation of long and short assets to facilitate economic analysis of beneficiary interests.

Figures 1, 2:
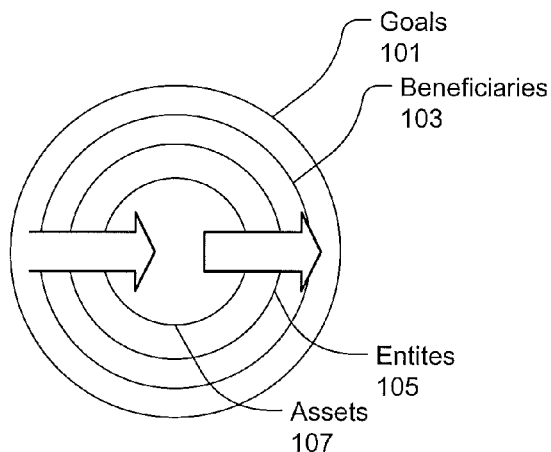
FIG. 1 conceptually depicts the relationships among assets, entities, beneficiaries and goals.
FIG. 2 summarizes a complex of family trusts with varying beneficiary interests. A variety of immediate, deferred and contingent interests are illustrated, with additional possible interests listed.

In the abstract, analysis begins by recognizing layers of assets, entities, beneficiaries and goals, as illustrated in FIG. 1. Assets are held by entities. Assets are subject to portfolio analysis. Beneficiaries have interests in assets of the entities, by their relationship to the structure of the entities. The beneficiary interests are not directly subject to portfolio analysis. Goals for activities to be financed by the beneficiary interests and policies for investing set and steer the course.

In the materials incorporated by reference, we have described balancing of resources and claims using a balance sheet of sorts. Resources are assets of various types held by one or more legal entities. Returns on the assets accrue to the beneficiaries through the entities. Claims are goals that the beneficiary interests should enable. Goals can be expressed as essential, additional and aspirational. A balance sheet shows the extent to which the present value of resources satisfies the present cost of the goals, by category. A surplus can be expressed as a margin of safety, using risk-at-value measures. A shortfall in meeting goals may lead to a readjustment of goals or a different investment strategy.

FIG. 2 depicts interests in a family of legal entities, as an example of what a trusted advisor needs to consider. The structure is complex and the advisor's role is challenging. The advisor takes into account efficiencies and risk management. The advisor is expected to generate required cash flows from the assets and help the family keep resources and claims in balance. Efficiencies include investing, tax and transfer efficiencies. Part of investment efficiency is risk management. Tax and transfer efficiencies implicate the legal structure of entities. Cash flow analysis, described in the incorporated materials, shows how resources will be spent to meet goals over time. Focus on the overall balance of resources and claims can be more productive than looking at the details of cash flow, especially when there is a surplus of resources to meet at least essential goals. Keeping resources and claims in balance can usefully begin with a family mission statement.

A family mission statement for a family with assets structured as depicted in FIG. 2 is detailed in the incorporated materials. (1) The assets should be managed in a prudent and efficient manner to preserve their real economic value and to enhance it where compatible with overall goals. (2) Primary goals include providing and income to Alex and Sylvia M. 210, 220; transferring a basic inheritance to the children of Alex 240, 250, 260, 270; and supporting a parent 280. (3) Secondary goals include providing additional income; funding a program of charitable giving, funding to weddings and education; funding a pension for a caretaker and companion 290; establishing a financial reserve for future goals; and enhancing the children's inheritance. (4) Additional goals may be purchasing a yacht and increasing philanthropy. (5) Residual goal is that additional assets should be invested in a moderately aggressive fashion for long-term wealth creation. In the incorporated materials, dollar amounts and dates are given for a hypothetical Alexander Montgomery family with these goals.

The particular legal entities in FIG. 2 are among a large number of entity types that include households, trusts, corporations and foundations. Within these broad categories, there are number of subcategories. For instance, trusts may be revocable, irrevocable, grantor, or defective grantor trusts, among others. Abstracting and generalizing, we note the following features of a legal entity: (1) It has a type and a subtype. (2) It may hold property, such as real estate or investment accounts. (3) Depending on its type, it defines a set of roles and persons associated with the roles. A person may be either natural or corporate person. For instance, a trust defines a trustee role. The trustee role may be filled by either a natural person or trust company. (4) It may have a terminating event, after which the entity ceases to exist. The entity may never terminate, it may terminate at a fixed date, after the first or last death of people in a list, or at some combination of a fixed date and a death event. (5) an entity has a list of beneficial interests. A beneficial interest, which we sometimes refer to as a beneficiary interest, is a combination of beneficiary and interest. A beneficiary can be either a natural person or an entity.

Looking at FIG. 2, we see individuals with various relationships. Alex 210 is married to Sylvia 220 and previously was married to Helen 230. Alex and Sylvia have one child Cedrick 270. Alex and Helen had three children, Didi, Nicki and Robert 240, 250, 260. Jane 280 is Alex's mother. Violet 290 is mother's caretaker or companion. The various entities 201-208 are owned or controlled by or subject to Alex's beneficiary interest. We reference beneficial interests in the entities by combining the row and column numbers in the chart. Alex has 100 percent control 211 of the AM trust 201. Remainder interests in the trust are divided equally among four children of two marriages 241, 251, 261, 271. Alex has a deferred interest in the principal in income from his independent retirement account 212. Control of the M foundation is shared by Alex with Sylvia 213, 223. Trusts were established for three children of the first marriage, each child an undivided interest in the income and principal of a trust 244, 255, 266. Alex as a contingent remainder interest in the HM trust 218, in which Helen has an income interest 238 and three children have remainder interests 248, 258, 268. From FIG. 2, it is apparent that evaluating the economic position of any particular beneficiary requires attributing appropriate assets to the beneficiary's portfolio. The appropriate assets may combine assets actually held by one of the entities with hypothetical assets.

The interests depicted in FIG. 2 are among a wide range economic benefits that can be generated by an entity. A trust, for instance, may provide ownership, life income, principal and remainder interests.

An ownership interest is characterized by percentage from zero to 100 percent. The percentage of ownership corresponds to the control fraction that gives a percentage control of the entity. Ownership gives full participation in economic benefits of the entity.

An income interest terminates either on a given day, on the beneficiary's death, or on the earlier of the two events. Income interest can be stated in a variety of ways. A beneficiary may share in the entity's annual income. A beneficiary may receive the stated dollar amount, potentially with cost-of-living adjustments which may be annual, quarterly or on some other frequency. Cost reimbursement is a variety of income interest, in which the beneficiary receives income equal to a multiple of the beneficiaries cost experience in a year. Typical costs are for education, health and general living expenses. A normal annual expense can be calculated for any of these cost categories.

If an entity terminates before the income interest terminates, the remaining income interest may be satisfied in a variety of ways. The beneficiary may be paid this stated value, potentially subject to inflation escalation. The beneficiary may be paid a multiple of the average benefit data over a stated number of years prior to termination. Or, the beneficiary may get nothing. Of course, other variations are possible.

A remainder income interest entitles the holder to share in income not otherwise disposed of. A remainder income interest typically terminates when the entity terminates, which may coincide with termination of a primary income interest.

A capital interest provides a percentage share or a dollar claim against an asset. A dollar amount interest in an asset, potentially may be subject to inflation escalation. An interest may mature at a stated time or termination of the entity. The benefit may be accelerated or forfeited if the entity terminates before a stated time. The benefit may or may not be forfeited upon death of the beneficiary, prior to distribution the benefit.

A remainder capital interest provides a share of the residual value assets held by the entity upon termination of the entity.

A contingent interest transforms into or triggers one of the other interests if the contingency is met. The contingency that gives rise to another type of interest may, for instance, be that everyone on the list of persons dies before a stated day or the termination of the entity. Or, at least some number of persons on the list survives to a stated date or termination of the entity. Many other contingencies can be imagined.

Consider, for example, a testamentary trust that old assets are in the life of a surviving spouse, with the provision that income will be paid currently to the surviving spouse and a capital will be available to pay health expenses. When a spouse dies, the interest is divided equally between two children. Here, the entity is a trust the terminates on the death of the spouse. The spouse as income interest equal to 100 percent of income with no terminal benefit. The spouse also has an income interest measured by health costs. The children have remainder capital interest of 50 percent each.

In another example, a grantor retained annuity trust pays a grantor an annuity of $100,000 per year for five years and pays a remainder to a child. If the grantor dies within five years, the remainder goes to the grantor's estate. The grantor has an income interest, the child has a remainder capital interest, and the estate has a contingent capital interest.

The following abstractions or generalizations are useful. An interest has a beneficiary and an entity. An interest terminates with the termination of the entity. An interest may terminate when a beneficiary dies or it may pass to a new beneficiary. An interest may be present or contingent interest. A contingent interest becomes a present interest once the condition of the contingency is met. An interest may be a claim on current income, accumulated income, or capital of an entity. There may be some ordering as to which class is called upon first to satisfy the interest. For instance, health expenses may be paid first from income and then from capital. An interest is limited to the available class of resource of the entity at which it has a claim. An income interest is not allowed to invade capital. An interest is payable at a time or at some frequency within a window of time. The payment time or window boundaries can be defined either by a date or an event. Typical advance used to define payment windows are termination of entities, termination of beneficiaries or death of natural persons. The amount of an interest can be stated in a variety of ways. The amount can be a specific sum, a sum adjusted by a price index, realized costs of an activity or a share of a class of resource. An interest can be assigned a priority within its resource pool, such that it is paid only after claims of high-ranking interests. With these characteristics in mind, we propose a novel way to automatically characterize the economic benefits of beneficiary interests so that they can be analyzed as beneficiary portfolio.

A beneficiary is someone who holds at least an interest in an entity and may hold multiple interests in multiple entities. We disclose a method and system for automatically creating a beneficiary portfolio that includes real and hypothetical assets, which represents the beneficiary's interests. Creating a beneficiary portfolio is this way permits analysis using standard portfolio analysis techniques. Portfolio analysis techniques model the economic consequences of interests held by beneficiaries. This depends on the hypothetical asset qualifying as an asset that the analysis technique understands. That is, the hypothetical asset is in the analysis universe. In general, we assume that if a non-derivative asset is in the analytic universe, techniques are available for understanding income-only and principal-only derivatives of the asset. The analytic universe includes insurance and annuities, particularly whole life insurance, term life insurance and (both life and single payment).

To create a beneficiary portfolio for a beneficiary who has interests in several entities, we consider each entity in turn. We look at each of the interests assigned from an entity and map hypothetical assets to interest categories as appropriate.

For a beneficiary with a percentage ownership interest in an entity, we add a percentage of each asset held by the entity to the beneficiary portfolio.

For a beneficiary with an income interest, several treatments are possible, depending on how the income interest is defined. If the beneficiary is entitled to a share of income from the entity, we add a percentage of an income-only derivative in each asset held by the entity to the beneficiary portfolio. If the beneficiary is entitled to cost recovery, we equate the expected cost an annuity that has initial "normal" payout. We multiply the normal payout times the applicable multiplier, potentially inflated by cost index. For instance, recovery of health costs would be inflated by a health care cost index, while living expenses would be subject to a cost-of-living index. If there is a terminal payout upon entity termination, we represent that by a hypothetical term life policy, with the benefit amount equal to the termination benefit and the payout criterion identical with the entity termination criterion.

In FIG. 3, we illustrate creation of beneficiary portfolios that include a payout for life to a particular beneficiary. The trust 301 holds at least one asset 311. For portfolio analysis, we allocate this asset to the other beneficiaries 313. The beneficial interest of the particular beneficiary 302 is represented by a long position in a life term annuity 322. The long position is offset by a short position 323 allocated to the other beneficiaries 302. Comparing the trust portfolio 301 to the portfolios of the particular beneficiary 302 and the other beneficiaries 303, we see that the hypothetical long and short interests 322, 323 are balanced, so the combined beneficiary portfolios 302, 303 have the same expected payout and cost as the original trust portfolio 303.

In FIG. 5, we depict a terminal payout to a particular beneficiary. The asset held by the trust 511 is allocated to the other beneficiaries 513. The beneficiary portfolio for the particular beneficiary 502 is allocated a long position in a term life policy 522 with the benefit amount equal to the termination benefit. The long position is offset by a short position in a term life policy 523 assigned to the other beneficiaries 503.

In FIG. 9, we depict an extended cost recovery for health costs. The particular beneficiary 902 is covered for both immediate health costs and long-term residential care. The asset 911 in the trust 901 is assigned to the other beneficiaries 913. The particular beneficiary is assigned long positions in a medical insurance policy 922 and a long-term healthcare policy 932. The long insurance positions are offset by short positions 923, 933 and in beneficiary portfolios of the other beneficiaries 903.

For a beneficiary with the remainder income interest, we divide the trust asset into derivatives for income-only and principal-only. This is illustrated in FIG. 4. Supposing that the remainder interest is subject to periodic payments to other beneficiaries, we add a long position in an annuity 423 to the other beneficiaries 403. This is balanced by a short position in the annuity 422 added to the beneficiary portfolio of the particular beneficiary 402. The particular beneficiary also is assigned the income-only derivative 412. If the other beneficiaries have different interests, the other beneficiaries interests 403 are appropriately represented as long positions 433 and balanced by short positions 422 in the beneficiary portfolio for the particular beneficiary. This is generally illustrated in FIG. 6, which depicts how to represent a particular beneficiary's capital remainder interest so that it can be handled by portfolio analysis.

For a beneficiary with a capital interest, the handling depends on whether the capital interest is a share of an asset or a dollar amount. FIG. 7 illustrates the case in which the particular beneficiary is entitled to a percentage of the asset. Then, the asset in the trust portfolio 701 is represented as an income-only derivative 711 plus a principal-only derivative 721. The income-only derivative is assigned 713 to the other beneficiaries 703. The respective percentages of the principal derivative are assigned to the particular beneficiary 722 and the other beneficiaries 723. FIG. 8 illustrates the case in which the particular beneficiary is entitled to a specific dollar amount from the asset. The trust asset 811 is assigned to the other beneficiaries 813. A long position in a single period annuity 822 is assigned to the beneficiary portfolio of the particular beneficiary 802. The long position is balanced by a short position in the same annuity 823 assigned to the beneficiary portfolios of the other beneficiaries 803.

In these examples we disclose representing beneficial interests in individual beneficiary portfolios as combinations of assets held by a trust with long and short positions of hypothetical assets. The long and short positions are offsetting, so the combined holdings of the beneficiary portfolios precisely equal the holdings of the trust portfolio. The expected payout of a select of hypothetical position (sometimes combined with an asset) equals the beneficial interest in the portfolio. This approach can be implemented in a system or described as a method.

Figure 10:
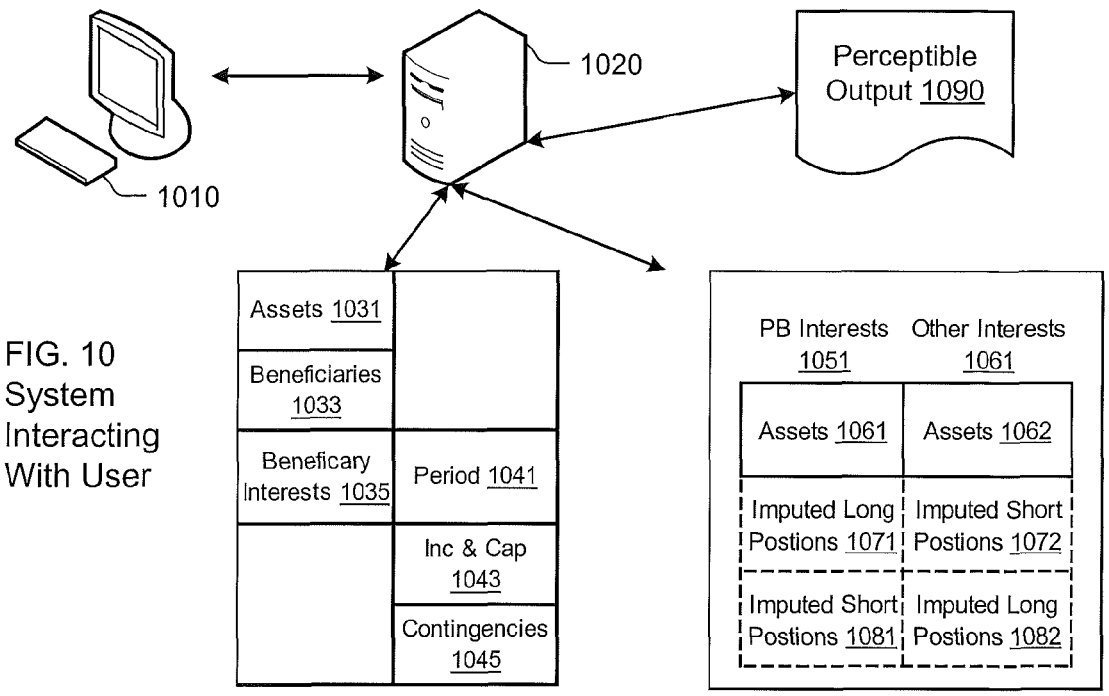
FIG. 10 depicts a system that interacts with a user to collect data and perform trust analyses.

FIG. 10 depicts a system that interacts with the user, receiving input, constructing beneficiary portfolios and producing perceptible output. A server or other device with logic and resources 1020 interacts with a user 1010 who typically has a trusted advisor. Of course, a beneficiary also could interact with the server. The server collects from the user 1010 a variety of information about entity assets and beneficial interests. The information listed includes assets 1031, beneficiaries 1033 and beneficiary interest 1035. A beneficiary interest is described by a time period. 1041, a relationship to income and capital 1043, and contingencies 1045. This description may be stored in a data tuple. The description of a beneficiary or beneficial interest further may include a terminating event, or a single payment interest can be implied by a null terminating event. It also may include priority information, if the interest is subject to prior satisfaction of other priorities.

The system 1020 converts the import 1031-1045 into beneficiary portfolios 1051-1052. The portfolios include assets 1061, 1062 at hypothetical long and short positions 1071, 1072, 1081, 1082. These beneficiary portfolios are subject to portfolio analysis, from which perceptible output 1090 is generated.

There are several useful analyses of beneficiary portfolios that can be used to produce perceptible output 1090. Of course, these analyses of beneficiary portfolios include both the actual hypothetical assets. It is useful to value and project cash flow from a portfolio. Portfolio holdings may be characterized by the fractions of value allocated to types of investments, investment styles, sectors of the economy and sectors of global capital market. A beneficiary portfolio may be measured for exposure to investment risk, including analyzing the amount of value-at-risk. A particular portfolio may be characterized in terms of investment risk and return, for instance positioned along an efficient frontier. Simulation can be applied to a beneficiary portfolio, either under the assumption of a static mix of underlying assets or a dynamic investment strategy. The simulation can be constrained to generate or avoid specific scenarios where it can be run many times and the outcomes categorized by scenario. Scenarios may, for instance, include the order of death of various beneficiaries. This is of particular interest when a family of entities evolves over time at the hands of multiple advisors. Simulation that produces a variety of death orders will sometimes reveal unexpected dispositions of assets. Productivity of a beneficiary portfolio can be measured in terms of investment risk exposures, investment risk, projected return and efficiency relative to goals set by the beneficiary. The likelihood of satisfying essential, additional and aspirational goals can be calculated by simulation.

Individual beneficiary portfolios and a family of beneficiary portfolios can be optimized using the methods and systems disclosed in Provisional Application No. 60/979, 765, filed 12 Oct. 2007, which was incorporated by reference above. Further detail regarding interesting analyses of beneficiary portfolios that include real and hypothetical assets appears in the materials incorporated by reference.

Figure 11:
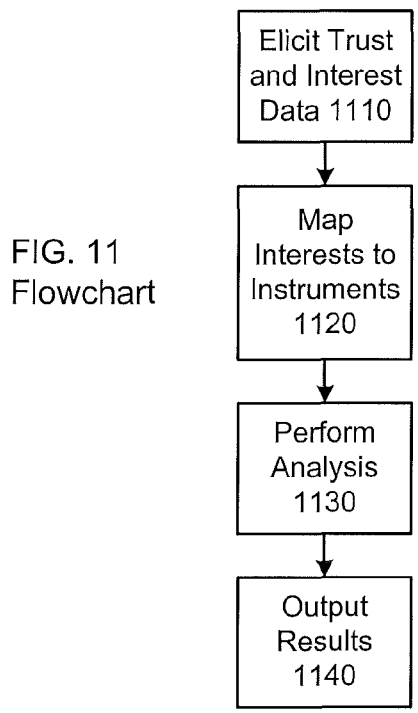
FIG. 11 is a high-level flowchart of data entry, analysis and output.

FIG. 11 is a general flowchart of a method that maps hypothetical assets to beneficiary portfolios and produces perceptible output. The method includes eliciting trust and goal related data 1110. This includes both resource and claim information and beneficial interest information. The method maps beneficial interest to financial and derivative instruments 1120. Any of a variety of portfolio analyses can be applied 1130 to individual beneficiary portfolios, the family of beneficiary portfolios or the trust portfolio. Beneficiary portfolios may optionally include separate assets of the beneficiary that are not controlled or held by the family of entities. Analyses for various portfolios can be summarized and graphically depicted in comparison to each other. The results are output in a perceptible form 1140. They may be printed or displayed on a monitor.

Some Particular Embodiments

The present invention may be practiced as a method or device adapted to practice the method. The invention may be an article of manufacture such as media impressed with logic to carry out computer-assisted mapping of beneficiary interests in a trust to actual and hypothetical assets in beneficiary portfolios and performing portfolio analysis on the resulting beneficiary portfolios.

One embodiment is a computing device that collects trust related data and automatically constructs beneficiary portfolios including real and hypothetical assets. This device includes logic and resources coupled to a network. It includes a listing module, a beneficiary module and a portfolio analysis module, which run on the logic and resources. The eliciting module interacts via network with the user and collects trust related data. The trust related data collected includes at least an identification and ownership of trust assets, and identification of beneficiaries, and a description of beneficiary interests in the trust assets. The description of the beneficiary interest includes a period of the beneficiary interest, relationship of the beneficiary interest income and capital and applicable contingencies, if any. The beneficiary portfolio module is coupled to the trust related data collected by the eliciting module. It constructs beneficiary models by automatically mapping the beneficiary interests to combinations of long and short positions in financial or derivative interests that have expected payouts and costs equal to the beneficiary interest in the trust assets. It automatically allocates the long and short positions to beneficiary portfolios of a particular beneficiary having a particular beneficiary interest and to beneficiary portfolios of other beneficiaries. The portfolio analysis module is coupled to the beneficiary portfolios. It performs portfolio analysis on actual and hypothetical assets in the beneficiary portfolios and produces a perceptible output summarizing results of the portfolio analysis.

One aspect of this embodiment further includes internal characterization data tuples that represent the beneficiary interest. These data tuples are stored in computer readable media. The data elements of the tuples include at least a trigger for the beneficiary to receive a payout from the beneficiary interest, a terminating event for the beneficiary to stop receiving the payout, a payout schedule of payout string the time from the triggering event to the terminating event, and inflation flag for whether scheduled amounts (as opposed proportions) among the payouts are inflation-adjusted, a claim schedule of claims of the beneficiary interest against current income, accumulated income and/or principal in the trust assets, and a priority schedule of priority of the beneficiary interest claims in relation to other claims against the trust assets. According to this aspect, the trust related data is stored in the internal characterization data tuples.

Another aspect of this embodiment further includes the eliciting module adapted to collect individual assets information from a least one particular beneficiary regarding their individual, non-trust assets. It further includes a portfolio analysis module adapted to perform the portfolio analysis on the actual and hypothetical assets in the beneficiary portfolio combined with the individual assets of the particular beneficiary.

A further aspect of this embodiment includes the portfolio analysis module adapted to run portfolio analyses that take into account statistical uncertainty of performance of the beneficiary portfolio.

In the disclosure above, we describe a variety of examples of automatically mapping beneficiary interest to long and short positions in hypothetical and real assets. All of the examples described above are aspects of the device embodiment. In particular, the beneficiary interest may include at least a remainder interest in a cumulated income in favor of the particular beneficiary, subject to a sequence of payouts for life to a second beneficiary from income produced by the trust asset. According to this aspect, the device further automatically maps the income of the trust assets to an income-only derivative and the principal of the trust asset to the principal-only derivative. It maps the payout to a long position in annuity for the second beneficiary and a short position in the annuity for the particular beneficiary. It allocates these long and short positions in the financial or derivative instruments to the beneficiary portfolios. It allocates the income-only derivative to the particular beneficiary.

This device embodiment and it's aspects may be combined with a variety of analyses including the descriptive and insightful analyses described in U.S. patent application Ser. No. 11/627,814 and the solution methods described in provisional application No. 60/979,765. The modules identified can be adapted to perform any of the methods described in this application, including methods described in the material incorporated by reference.

One method embodiment is a computer implemented method of attributing interest in at least one trust to a plurality of beneficiaries who received differing benefits at differing times. This method includes interactively the eliciting a description of trust assets and interest. The description elicited includes an identification and ownership of trust assets, and identification of beneficiaries, and a description of beneficiary interests in the trust assets. The description of beneficiary interest includes a period of the beneficiary interests, a relationship of the beneficiary interest income and capital and applicable contingencies. The method proceeds with creating beneficiary portfolios by automatically mapping the beneficiary interest to long and short positions in financial or derivative instruments having expected payouts and costs equal to the beneficiary interests in the assets. It further includes analyzing at least one beneficiary portfolio for a particular beneficiary and perceptibly reporting results of the analysis.

One aspect of this method, for a particular beneficiary, further includes combining non-trust assets to the beneficiary with the beneficiary portfolio for combined analysis.

Another aspect of this method is analyzing the beneficiary portfolio by taking into account statistical uncertainty in performance of the beneficiary portfolio.

This method may be employed to analyze a plurality of beneficiary portfolios in scenarios that involve differing orders of death among the beneficiaries.

As with the device embodiment, the method embodiment may include creating internal characterization data tuples for the beneficiary interests. These data tuples may include at least a trigger for the beneficiary to receive a payout from the beneficiary interest, a terminating event for the beneficiary to stop receiving the payout, a payout schedule of payout string the time between the triggering and terminating events, an inflation flag for whether the scheduled amounts are inflation-adjusted, a claim schedule claims of the beneficiary interest against current income accumulated income, and/or principal in the trust assets, and a priority schedule of priority of the beneficiary interest claims in relation to other claims against the trust assets. Applying the data tuple aspect, the automatic mapping action uses the internal characterization data tuples to select the long and short positions in the financial or derivative instruments.

Optionally, the automatic mapping maybe presented to a user for confirmation or editing.

Again, we describe above a variety of examples of automatically mapping beneficiary interests to long and short positions in hypothetical and real assets. In one case, the beneficiary interests include at least a sequence of payouts that extend until a particular beneficiary's death. These payouts have priority over other interests of other beneficiaries. The method further includes automatically mapping the payouts to a long position in an annuity for the particular beneficiary and an offsetting short position in the annuity for the other beneficiaries. These long and short positions are readily subject to portfolio analysis, whereas portfolio analysis tools do not understand a beneficial interest in a trust that affords payouts until a beneficiary's death.

In another case, the beneficial interests included at least a sequence of payouts for health cost recovery that extend until a particular beneficiary's death. These payouts have priority over interests of other beneficiaries. The method further includes automatically mapping the payouts to long position in a health insurance policy for the particular beneficiary and an offsetting short position in a health insurance policy for the other beneficiaries. Of course, these mapped positions are allocated to their respective beneficiary portfolios as hypothetical assets.

In a further case, the beneficiary interests include at least a remainder interest in accumulated income from a trust asset in favor of the particular beneficiary. This remainder interest is subject to a sequence of payouts for life to a second beneficiary from income produced by the trust asset. The method further includes automatically mapping the income of the trust asset to an income-only derivative and the principal of the trust asset to a principal-only derivative. It includes mapping the payout to a long position in an annuity for the second beneficiary and an offsetting short position in the annuity for the particular beneficiary and allocating the long and short positions to the beneficiary portfolios. It further includes allocating the income-only derivative to the particular beneficiary.

In yet a different case, the beneficiary interests include at least a payout on behalf of a particular beneficiary triggered by the particular beneficiary death. This may be a legacy payout. The payout has priority over a remainder interest of other beneficiaries. The method further includes automatically mapping the payout to a long position in a term life policy for the particular beneficiary and an offsetting short position in the term life policy for the other beneficiaries.

Another case involves beneficiary interest that included at least a remainder interest in a trust asset in favor of a particular beneficiary. This method further includes allocating the trust asset to the particular beneficiary and mapping all other beneficiary interests that have a claim on the trust asset as long positions representing the beneficiary interests in respective beneficiary portfolios and is offsetting short positions in the particular beneficiary portfolio.

A pair of capital interest cases involve distribution of proportionate shares and specific dollar amounts from a trust asset. In this proportionate share case, a particular beneficiary is entitled to a capital interest in a proportionate share of a trust asset, subject to income interests of other beneficiaries. The method further includes mapping income from the trust asset to an income-only derivative and principal of the trust asset to a principal-only derivative. It further includes allocating the particular beneficiary's proportionate share of the principal-only derivative to the particular beneficiary's portfolio. The case in which the particular beneficiary has a dollar amount interest in the capital of a particular trust asset, the method further includes mapping the dollar amount of the capital interest in the trust asset to a long position in a single period annuity for the particular beneficiary's portfolio and an offsetting short position in the single period annuity for the other beneficiaries.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in: methods for automatically mapping and allocating real and hypothetical assets to match beneficial interests in trust assets while facilitating portfolio analysis of the resulting beneficiary portfolios, systems including logic and resources to carry out mappings and allocations to create beneficiary portfolios; systems that take advantage of computer-assisted mapping and allocation of real and hypothetical assets into beneficiary portfolios; media impressed with logic to carry out mapping and allocation of real and hypothetical assets into beneficiary portfolios; methods of sending and receiving data streams intended to be persisted in memory, at least temporarily, that are impressed with logic to carry out mapping and allocation of real and hypothetical assets into beneficiary portfolios, or computer-accessible services that carry out computer-assisted mapping and allocation of real and hypothetical assets into beneficiary portfolios. It is contemplated that modifications and combinations will readily occur to those skilled in the art, which modifications and combinations will be within the spirit of the invention and the scope of the following claims.

We claim as follows:

1. A computing device that collects trust-related data and automatically constructs beneficiary portfolios including real and hypothetical assets, the device including:

a processor coupled to a network;
an eliciting module running on the processor coupled that interacts via a network with a user and collects trust-related data including at least
an identification and ownership of trust assets;
an identification of multiple beneficiaries;
a description of divided beneficiary interests in the trust assets, including a period of the beneficiary interest, a relationship of the beneficiary interest to income and capital, and contingencies, if any, that define the beneficiary interests; and
a beneficiary portfolio module running on the processor and coupled to the trust-related data collected by the eliciting module, that constructs multiple complementary beneficiary portfolios by automatically
mapping the divided beneficiary interests to hypothetical combinations of complementary long and short positions in financial or derivative instruments that have expected payouts and costs equal to the beneficiary interests in the trust assets; and
allocating the hypothetical long and short positions to the beneficiary portfolios; and
a portfolio analysis module running on the processor and coupled to the beneficiary portfolios, that accesses expected returns and risks and performs portfolio analysis on the combinations of actual and hypothetical assets in at least one of the beneficiary portfolios and produces a perceptible output summarizing results of the portfolio analysis.

2. The device of claim 1, further including:
internal characterization data tuples that represent the beneficiary interests in computer readable memory, including data elements representing at least
a trigger for a beneficiary to receive a payout from the beneficiary interest;
a terminating event for the beneficiary to stop receiving the payout from the beneficiary interest;
a payout schedule of payouts during the time from the triggering event to the terminating event;
an inflation flag for whether scheduled amounts (as opposed to proportions) among the payouts are inflation adjusted;
a claim schedule of claims of the beneficiary interest against current income, accumulated income and/or principal in the trust assets; and
a priority schedule of priority of the beneficiary interest claims in relation to other claims against the trust assets; and
wherein the trust-related data is stored in the internal characterization data tuples.

3. The device of claim 1, further including:
the eliciting module adapted to collect individual assets information of at least one particular beneficiary; and
the portfolio analysis module adapted to perform the portfolio analysis on the actual and hypothetical assets in the beneficiary portfolio combined with the individual assets of the particular beneficiary.

4. The device of claim 1, further including:
the portfolio analysis module adapted to run portfolio analyses that take into account statistical uncertainty of performance of the beneficiary portfolio.

5. The device of claim 1, wherein the beneficiary interests include at least a remainder interest in accumulated income in favor of a particular beneficiary, subject to a sequence of payouts for life to a second beneficiary from income produced by a trust asset, further including automatically:

mapping the income of the trust asset to an income-only derivative and the principal of the trust asset to a principal-only derivative;

mapping the first payout to a long position in an annuity for the second beneficiary and a short position in the annuity for the particular beneficiary and allocating the long and short positions to the beneficiary portfolios; and allocating the income-only derivative to the particular beneficiary.

6. A computer-implemented method of attributing interests in at least one trust to a plurality of beneficiaries who receive differing benefits at differing times, the method including:

running an eliciting module running on a processor that interacts via a network with a user and collecting trust-related data including at least an identification and ownership of trust assets;

an identification of multiple beneficiaries;

a description of divided beneficiary interests in the trust assets, including a period of the beneficiary interest, a relationship of the beneficiary interest to income and capital, and contingencies, if any, that define the beneficiary interests; and running a beneficiary portfolio module on the processor, using the trust-related data collected by the eliciting module, and constructing multiple complementary beneficiary portfolios by automatically mapping the divided beneficiary interests to hypothetical combinations of complementary long and short positions in financial or derivative instruments that have expected payouts and costs equal to the beneficiary interests in the trust assets; and allocating the hypothetical long and short positions to the beneficiary portfolios; and running a portfolio analysis module on the processor, using at least one of the beneficiary portfolios, accessing expected returns and risks, performing portfolio analysis on the combinations of actual and hypothetical assets in at least one of the beneficiary portfolios and producing a perceptible output summarizing results of the portfolio analysis.

7. The method of claim 6, further including:

for a particular beneficiary, combining non-trust assets of the beneficiary with the beneficiary portfolio for combined analysis.

8. The method of claim 6, wherein the analyzing the beneficiary portfolio takes into account statistical uncertainty of performance of the beneficiary portfolio.

9. The method of claim 6, wherein the analyzing the beneficiary portfolio includes analyzing differing orders of death among the beneficiaries.

10. The method of claim 6, wherein automatically mapping includes:

creating internal characterization data tuples for the beneficiary interests including at least a trigger for the beneficiary to receive a payout from the beneficiary interest;

a terminating event for the beneficiary to stop receiving the payout from the beneficiary interest;

a payout schedule of payouts during the time from the triggering event to the terminating event;

an inflation flag for whether scheduled amounts (as opposed to proportions) among the payouts are inflation adjusted;

a claim schedule of claims of the beneficiary interest against current income, accumulated income and/or principal in the trust assets; and a priority schedule of priority of the beneficiary interest claims in relation to other claims against the trust assets; and the automatically mapping uses the internal characterization data tuples to select the long and short positions in the financial or derivative instruments.

11. The method of claim 6, wherein the automatic mapping is presented to a user for confirmation or editing.

12. The method of claim 6, wherein the beneficiary interests include at least a sequence of payouts that extend until a particular beneficiary's death, which payouts have priority over interests of other beneficiaries, further including automatically mapping the payouts to a long position in an annuity for the particular beneficiary and an offsetting short position in the annuity for the other beneficiaries.

13. The method of claim 6, wherein the beneficiary interests include at least a sequence of payouts for health cost recovery that extend until a particular beneficiary's death, which payouts have priority over interests of other beneficiaries, further including automatically mapping the payouts to a long position in a health insurance policy for the particular beneficiary and an offsetting short position in the health insurance policy for the other beneficiaries.

14. The method of claim 6, wherein the beneficiary interests include at least a remainder interest in accumulated income from a trust asset in favor of a particular beneficiary, subject to a sequence of payouts for life to a second beneficiary from income produced by the trust asset, further including automatically:

mapping the income of the trust asset to an income-only derivative and the principal of the trust asset to a principal-only derivative;

mapping the first payout to a long position in an annuity for the second beneficiary and an offsetting short position in the annuity for the particular beneficiary and allocating the long and short positions to the beneficiary portfolios; and allocating the income-only derivative to the particular beneficiary.

15. The method of claim 6, wherein the beneficiary interests include at least a payout on behalf of a particular beneficiary triggered by the particular beneficiary's death, which payout has a priority over a remainder interest of other beneficiaries, further including automatically mapping the payout to a long position in a term life policy for the particular beneficiary and an offsetting short position in the term life policy for the other beneficiaries.

16. The method of claim 6, wherein the beneficiary interests include at least a remainder interest in a trust asset in favor of a particular beneficiary, further including automatically:

allocating the trust asset to the particular beneficiary portfolio; and mapping all other beneficiary interests that have a claim on the trust asset as long positions representing the beneficiary interests in respective beneficiary portfolios and as offsetting short positions in the particular beneficiary portfolio.

17. The method of claim 6, wherein the beneficiary interests include at least a capital interest in a proportionate share of a trust asset in favor of a particular beneficiary, subject in income interest in of another beneficiary, further including automatically:

mapping income from the trust asset to an income-only derivative and principal of the third asset to a principal-only derivative; and allocating the proportionate share of the principal-only derivative to the particular beneficiary portfolio.

18. The method of claim 6, wherein the beneficiary interests include at least a capital interest in a dollar amount from a trust asset in favor of a particular beneficiary, further including automatically:

mapping the dollar amount from the capital interest in the trust asset to long position in a single period annuity in the particular beneficiary portfolio and an offsetting short position in the single period annuity in the trust portfolio, subject to claims by other beneficiaries.

* * * * *

UNITED STATES PATENT AND TRADEMARK OFFICE
CERTIFICATE OF CORRECTION

PATENT NO. : 7,844,523 B2
APPLICATION NO. : 12/028684
DATED : November 30, 2010
INVENTOR(S) : Nicolo G. Torre et al.

Page 1 of 1

It is certified that error appears in the above-identified patent and that said Letters Patent is hereby corrected as shown below:

At column 12, claim number 1, line 2, delete "coupled".

At column 13, claim number 8, line 46, delete the first occurrence of the word "the".

At column 13, claim number 9, line 49, delete the first occurrence of the word "the".

At column 16, claim number 18, line 2, insert --a-- before "long position".

Signed and Sealed this
First Day of February, 2011

David J. Kappos
*Director of the United States Patent and Trademark Office*